US011378176B2

(12) United States Patent
Fast

(10) Patent No.: US 11,378,176 B2
(45) Date of Patent: Jul. 5, 2022

(54) DEVICES, SYSTEMS, AND METHODS FOR DIFFERENTIAL LUBRICATION

(71) Applicant: Verlyn Ray Fast, Lafayette, IN (US)

(72) Inventor: Verlyn Ray Fast, Lafayette, IN (US)

( * ) Notice: Subject to any disclaimer, the term of this patent is extended or adjusted under 35 U.S.C. 154(b) by 0 days.

(21) Appl. No.: 16/988,075

(22) Filed: Aug. 7, 2020

(65) Prior Publication Data

US 2021/0180681 A1 Jun. 17, 2021

Related U.S. Application Data

(60) Provisional application No. 62/947,985, filed on Dec. 13, 2019.

(51) Int. Cl.
*F16H 57/04* (2010.01)
*F16H 48/08* (2006.01)
*F16H 57/031* (2012.01)

(52) U.S. Cl.
CPC ......... *F16H 57/0424* (2013.01); *F16H 48/08* (2013.01); *F16H 57/031* (2013.01); *F16H 57/0404* (2013.01); *F16H 57/0457* (2013.01); *F16H 57/0483* (2013.01)

(58) Field of Classification Search
CPC ...... F16H 57/031; F16H 57/037; F16H 57/04; F16H 57/0404; F16H 57/042–0424; F16H 57/0457; F16H 57/0483
See application file for complete search history.

(56) References Cited

U.S. PATENT DOCUMENTS

| 2,462,819 | A | * | 2/1949 | Trail | B01D 35/02 |
| | | | | | 184/13.1 |
| 5,476,582 | A | * | 12/1995 | Camping | B01D 35/06 |
| | | | | | 210/85 |
| 6,155,135 | A | * | 12/2000 | Gage | F16H 57/0416 |
| | | | | | 165/47 |
| 8,715,127 | B2 | * | 5/2014 | Beutler | B60B 35/163 |
| | | | | | 475/161 |
| 9,423,017 | B1 | * | 8/2016 | Francis | F16H 57/0404 |
| 10,190,673 | B2 | * | 1/2019 | Creech | F16H 57/045 |
| 10,443,705 | B1 | * | 10/2019 | Banks, III | F16H 57/0417 |
| 10,799,819 | B2 | * | 10/2020 | Malgorn | B01D 35/30 |
| 2016/0084365 | A1 | * | 3/2016 | Besemer | F16H 57/031 |
| | | | | | 475/86 |

FOREIGN PATENT DOCUMENTS

GB          2506509 A  *  4/2014  .........  F16H 57/0483

* cited by examiner

*Primary Examiner* — Ernesto A Suarez
*Assistant Examiner* — James J Taylor, III
(74) *Attorney, Agent, or Firm* — Reichel Stohry Dean LLP; Natalie J. Dean

(57) ABSTRACT

Differential assembly covers and methods are provided for filtering and cooling lubricant circulating within a differential assembly of a wheeled vehicle without the use of a pump. Systems for filtering and cooling lubricant are also provided, that include the disclosed covers in fluid communication with an auxiliary cooling system.

19 Claims, 8 Drawing Sheets

DEVICES, SYSTEMS, AND METHODS FOR DIFFERENTIAL LUBRICATION

PRIORITY

The present application is related to and claims priority benefit of U.S. Provisional Patent Application Ser. No. 62/947,985 to Fast, filed Dec. 13, 2019. The contents of the aforementioned priority application are hereby expressly incorporated by reference in its entirety into this disclosure.

BACKGROUND

Conventional automobiles typically include an internal combustion engine that output rotational torque to a transmission that, in turn, adjusts the speed and torque. The transmission subsequently translates adjusted rotational torque to a differential assembly.

A rear differential assembly is configured to selectively translate rotational torque to a rear differential in rear-wheel drive mode, or to both the rear differential and a front differential when the automobile is in in four-wheel-drive mode. To that end, conventional differential assemblies typically include a housing that supports a series of shafts, gears, chains, and linkages that cooperate to effect selectable translation of rotational torque to the differentials. Such housings can also define a sump in which a liquid lubricant is received.

The transfer case and/or differential assembly are typically lubricated with oil. Certain designs may include a pump assembly configured to transfer oil to the various shafts, gears, chains and linkages in operation. Such conventional pump assemblies typically include an oil pump in rotational communication with and driven by one of the shafts, gears, or chains, and displace liquid lubricant within the sump or reservoir chamber to the various components of the transfer case. To that end, the pump assembly also typically includes a pickup in fluid communication with lubricant disposed within the reservoir/sump.

Conventional rear differential housing designs are not sealed units, but instead generally have a single fill plug or vent tube at the top that allows access the lubricant reservoir. Over time, moisture can enter the differential unit therethrough and/or each time a vehicle is driven through water, snow, or mud. Water entering the differential breaks down the oil contained within the unit and, as a result, wears down the moving parts contained therein. Metal from the wearing parts then circulates in the oil causing further premature wearing. The oil in the differential mechanism may also become sulfated due to exposure to extreme prolonged heat, with the resulting sulphated oil unable to lubricate properly.

Although preventative maintenance on the differential mechanism is important, it is often overlooked. Primarily, the differential mechanism is located at the rear of, and underneath, the vehicle, which makes it difficult to access. Additionally, most rear covers for the differential mechanism do not contain drainplugs for draining the oil; instead, the entire cover for the differential mechanism must be removed from the transfer case by way of manually loosening a plurality of bolts in order to drain and change the oil. Most automotive repair shops will not remove the differential cover to change the oil due to the large number of vehicles that are returned with oil leaks as a result of this removal process.

Accordingly, rear differential lubricant is not often changed and seldom, if ever, filtered or cooled. Filter and/or cooling systems are not commonly employed with rear differential lubricant because conventional approaches necessarily require the inclusion of a pump (as mentioned above) to transfer the lubricant through the filter and cooler assembly. This is not necessarily desirable as, in addition to the reasons mentioned above, inclusion of a pump motor and other components within the differential housing adds complexity to a system that undergoes much stress and wear in operation.

Each of the components of a differential mechanism must cooperate to translate rotation effectively and selectively from the transmission to the differentials. In addition, each of the components must be designed not only to facilitate improved performance and efficiency, but also to reduce the cost and complexity of manufacturing the transfer case and ongoing maintenance requirements. There remains a need for a rear differential heating and cooling system that has superior operational characteristics, is simple in terms of design, requires reduced maintenance, and, at the same time, reduces the cost and complexity of manufacturing the components of the transfer case and rear differential system.

BRIEF SUMMARY

The present disclosure provides a novel cover for a vehicular differential assembly and, in certain aspects, a rear differential assembly. In at least one embodiment, the cover is configured for attachment to a differential assembly and comprises a series of vertical channels integrally formed on an interior surface of the cover and a filter assembly coupled with an exterior surface of the cover. The filter assembly may comprise an inlet, an outlet in fluid communication with a first channel of the series of channels, and a body extending between the inlet and outlet. The body may be configured to receive at least one filter cartridge therein.

The series of vertical channels may, in at least one embodiment, extend between a top portion of the cover and a bottom portion of the cover. The exterior surface of the cover may additionally comprise a series of alternating ridges and grooves, with each ridge corresponding to a channel integrally formed with the interior surface. In at least one embodiment, the exterior surface may, at least in part, comprise a thermally conductive material.

In at least one exemplary embodiment, the cover may additional comprise such a filter cartridge positioned within the filter assembly. Such cartridge, for example, may comprise a 40-micron filter cartridge or any other cartridge of a size and/or porosity that is sufficient to filter a lubricant.

The cover may also comprise a first exit port in fluid communication with a second channel of the series of channels. There, the second channel may be configured to direct a flow of lubricant slung therein toward and through the first exit port. Additionally or alternatively, at least one hose may be coupled with both the first exit port and the inlet of the filter assembly. Still further, the cover may comprise a second exit port that is in fluid communication with the first channel of the series of channels.

In certain embodiments, the filter assembly is configured to direct lubricant flow into the first channel of the cover. Such outlet may optionally comprise a deflector to prevent backflow of lubricant into the body of the filter. Furthermore, the filter assembly may abut, be coupled with or fastened to, or integrally formed with the exterior surface of the cover.

The second channel of the cover may be positioned on the interior surface of the cover such that, in use, when the cover is affixed to a differential assembly (rear or otherwise), the second channel is circumferentially aligned with a ring gear of the differential assembly so to receive lubricant slung therefrom.

Certain covers of the present disclosure further comprise a drain port and/or at least one horizontal channel. In at least one embodiment, the drain port is positioned at or near the bottom of the cover. Furthermore, a horizontal channel may extend perpendicular to the series of vertical channels at or near the bottom portion of the cover. In at least one exemplary embodiment, at least one of the horizontal channels is in fluid communication with the drain port.

Systems for filtering and cooling a differential assembly utilizing the novel covers of the present disclosure are also provided. In at least one exemplary embodiment, such a system comprises: 1) a cover comprising a series of vertical channels integrally formed on an interior surface of the cover, a first exit port in fluid communication with a second channel of the series of channels, a filter assembly coupled with/fastened to or integrally formed with an exterior surface of the cover, and a first exit port in fluid communication with a second channel of the series of channels; 2) at least one hose coupled with the first exit port of the cover and an inlet of the filter assembly; and 3) an auxiliary cooling system in fluid communication with the second exit port via a conduit.

There, the filter assembly may further comprise an inlet in fluid communication with the first exit port of the cover, an outlet in fluid communication with a first channel of the series of channels, and a body extending between the inlet and the outlet, where the body is configured to receive at least one filter cartridge therein. The second channel may be configured to direct flow of lubricant slung therein (in use) toward and through the first exit port.

In certain aspects, the system may further comprise a differential assembly (rear or otherwise) of a wheeled vehicle. In at least one embodiment, the differential assembly comprises a housing defining a second cavity and having at least one open side, a ring gear positioned within the second cavity of the housing, a pinion received within the second cavity (where the pinion comprises a plurality of teeth that are meshingly engaged with the ring gear), and a lubricant received within the second cavity. In at least one embodiment of the system, the cover is affixed (and/or configured to be affixed) to the at least one open side of the housing of the differential assembly such that a first interior cavity of the cover and the second cavity of the housing communicate and the second channel of the cover is circumferentially aligned with the ring gear of the differential assembly so to receive lubricant slung therefrom. Optionally, a gasket may be positioned between the housing and the cover to promote leak-free engagement between the two members.

Methods for filtering and cooling a differential assembly without a pump are also provided using the covers and systems of the present disclosure. In at least one embodiment, such a method comprises providing a cover comprising: a series of vertical channels integrally formed in an interior surface thereof; a filter assembly on an exterior surface of the cover (whether coupled with, integrally formed with, or otherwise), the filter assembly comprising an inlet, an outlet in fluid communication with a first channel of the series of channels, and a body extending between the inlet and the outlet and configured to receive at least one filter cartridge therein; and a first exit port in fluid communication with a second channel of the series of channels, the second channel configured to direct a flow of lubricant slung therein toward and through the first exit port; wherein the cover is affixed to a vehicular rear differential housing and defines a reservoir therewith; rotating a ring gear positioned within an interior of a vehicular rear differential housing to sling lubricant within the reservoir into the second channel of the cover; and directing a flow of the slung lubricant using the second channel of the cover through the first exit port and into the filter assembly. There, the rotation of the ring gear may drive the flow of slung lubricant through the second channel, through the filter assembly via the first exit port, and back into the interior of the vehicular rear differential housing via the outlet of the filter assembly.

The exterior surface of the cover may comprise a series of alternating ridges and grooves. In at least one embodiment, each ridge corresponds with a channel of the series of vertical channels integrally formed in the interior surface of the cover and comprises a thermally conductive material. In such embodiments, the method may further comprise the step of directing the slung lubricant through the series of vertical channels to cool the lubricant through convective heat transfer via the series of ridges and grooves.

Additional embodiments of the methods of the present disclosure further comprise: providing an auxiliary cooling system in fluid communication with the second exit port via a hose or other conduit, and directing the slung lubricant through the second exit port and through the auxiliary cooling system. It will be appreciated that such auxiliary cooling systems may comprise any cooling system known in the relevant arts or hereinafter developed that may be mounted at, near, or in a relatively accessible area to the respective differential assembly. Still further, the method may comprise returning lubricant cooled by the auxiliary cooling system to the reservoir of the vehicular rear differential assembly.

BRIEF DESCRIPTION OF THE DRAWINGS

The disclosed embodiments and other features, advantages, and aspects contained herein, and the matter of attaining them, will become apparent in light of the following detailed description of various exemplary embodiments of the present disclosure. Such detailed description will be better understood when taken in conjunction with the accompanying drawings, wherein.

Figure 1:
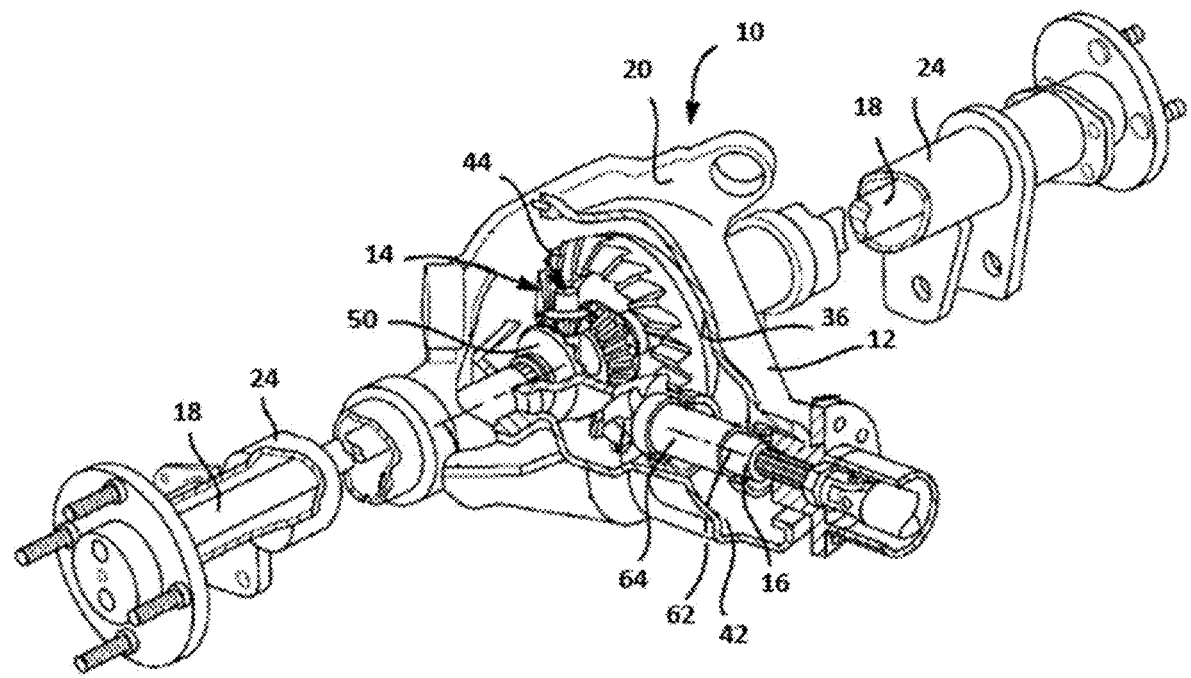
FIG. 1 shows a partially broken-away perspective view of a portion of a vehicle having an axle assembly.

While the present disclosure is susceptible to various modifications and alternative forms, exemplary embodiments thereof are shown by way of example in the drawings and are herein described in detail.

DETAILED DESCRIPTION

For the purposes of promoting an understanding of the principles of the present disclosure, reference will now be made to the embodiments illustrated in the drawings and specific language will be used to describe the same. It will nevertheless be understood that no limitation of scope is intended by the description of these embodiments. On the contrary, this disclosure is intended to cover alternatives, modifications, and equivalents as may be included within the spirit and scope of this application as defined by the appended claims. As previously noted, while this technology may be illustrated and described in one or more preferred embodiments, the compositions, systems and methods hereof may comprise many different configurations, forms, materials, and accessories.

In the following description, numerous specific details are set forth in order to provide a thorough understanding of the present disclosure. Particular examples may be implemented without some or all of these specific details and it is to be understood that this disclosure is not limited to particular biological systems, which can, of course, vary.

Various techniques and mechanisms of the present disclosure will sometimes describe a connection or link between two components. Words such as attached, linked, coupled, connected, and similar terms with their inflectional morphemes are used interchangeably, unless the difference is noted or made otherwise clear from the context. These words and expressions do not necessarily signify direct connections, but include connections through mediate components and devices. It should be noted that a connection between two components does not necessarily mean a direct, unimpeded connection, as a variety of other components may reside between the two components of note. Consequently, a connection does not necessarily mean a direct, unimpeded connection unless otherwise noted.

Furthermore, wherever feasible and convenient, like reference numerals are used in the figures and the description to refer to the same or like parts or steps. The drawings are in a simplified form and not to precise scale. It is understood that the disclosure is presented in this manner merely for explanatory purposes and the principles and embodiments described herein may be applied to devices and/or system components that have dimensions/configurations other than as specifically described herein. Indeed, it is expressly contemplated that the size and shapes of the composition and system components of the present disclosure may be tailored in furtherance of the desired application thereof.

Unless defined otherwise, all technical and scientific terms used herein have the same meaning as commonly understood by one of skill in the relevant arts. Although any methods and materials similar to or equivalent to those described herein can be used in the practice or testing of the subject of the present application, the preferred methods and materials are described herein. Additionally, as used in this specification and the appended claims, the singular forms "a", "an" and "the" include plural referents unless the content clearly dictates otherwise.

Figure 2:
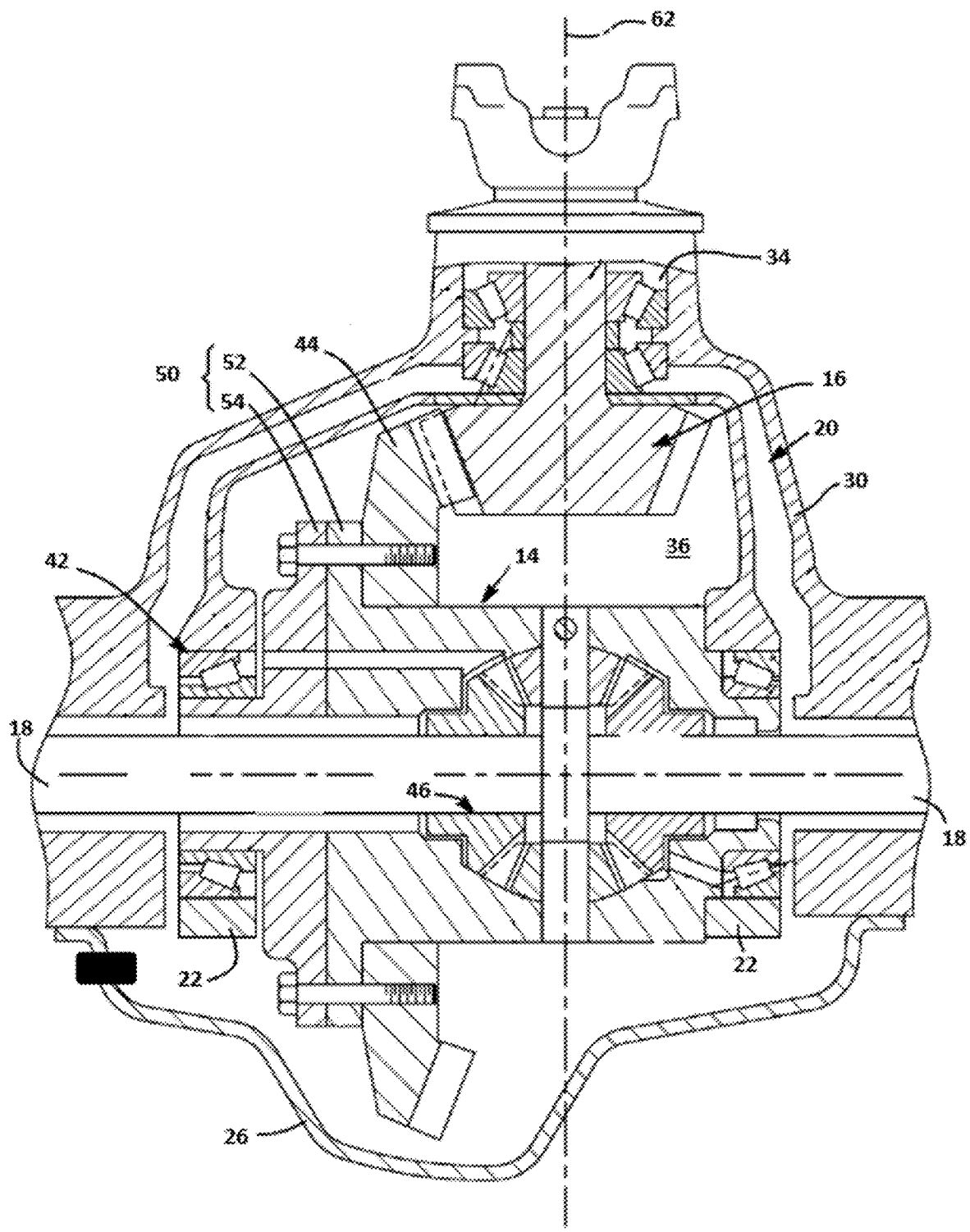
FIG. 2 shows a longitudinal sectional view of a portion of the axle assembly.
Figure 3:
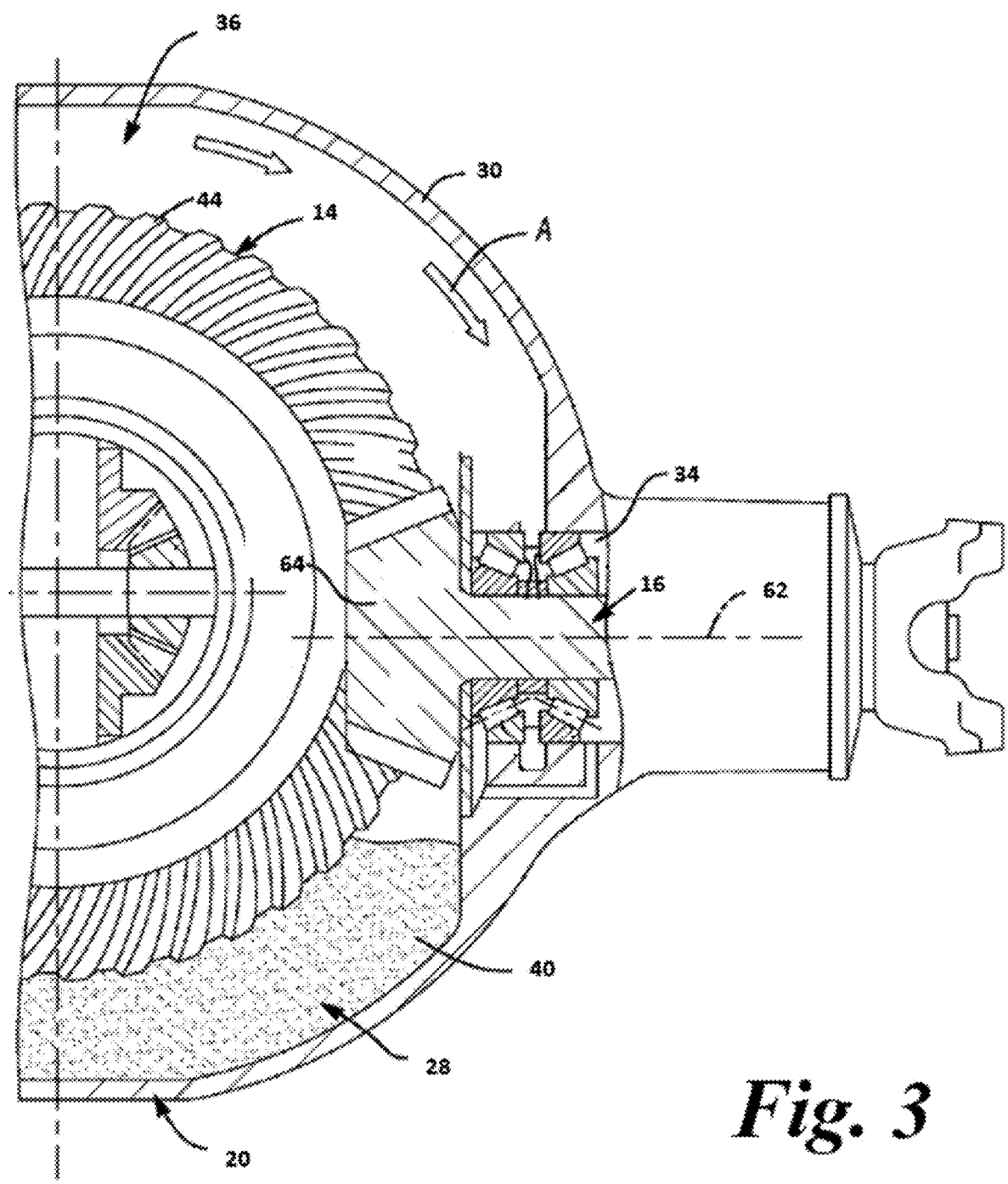
FIG. 3 shows a cross-section view of a portion of the axle assembly of FIG. 2.

Now referring to FIGS. 1-3, various views of conventional vehicle rear axle assemblies are shown to provide context. Perhaps more specifically, in FIG. 1, at least one embodiment of a rear axle assembly 10 is shown, which is configured for use in an automobile or other wheeled vehicle as is known in the art. It will be appreciated that, while FIGS. 1-3 illustrate at least one embodiment of a vehicle rear axle assembly, the inventive concepts, systems, devices, and methods of the present disclosure are not limited in application to the certain axle assembly designs discussed and, instead, can be applied to any axle assembly as desired and suitable.

As shown in FIG. 1, the rear axle assembly 10 can include an axle housing assembly 12, a differential assembly 14, an input pinion assembly 16, and a pair of axle shafts 18. While the axle housing assembly 10 in FIG. 1 is depicted in one configuration, it will be appreciated that the teachings of the present disclosure have application to other types of axle housing assemblies and no limitation with this respect is intended.

In at least one embodiment, the axle housing assembly 10 can include a housing 20, a pair of bearing caps 22, a pair of axle tubes 24, and a cover 26, and can also include a lubricant sump or reservoir 28. Further, as shown in FIGS. 2 and 3, housing 20 may include a wall member 30 that defines a pair of bearing journals, a pair of tube bores, a pinion bore 34, and defines a differential cavity 36.

The differential assembly 14 can be any type of differential, preferably a rear differential, and can include a differential case 50, a pair of differential bearings 42, a ring gear 44, and a gear set 46. While, in the embodiment shown in FIG. 2, the differential case 50 comprises a first case member 52 and a second case member 54, it will be appreciated that the differential case 50 may be unitarily formed or may comprise two or more case components.

The ring gear 44 is coupled with and positioned within the differential case 50 of the differential assembly 14 via a plurality of threaded fasteners or the like, or as is otherwise known in the art within the rear differential assembly 14. Further, the teeth of the input pinion assembly 36 may be meshingly engaged with the ring gear 44.

During operation of the vehicle in a predetermined direction (e.g., forward), rotary power is transmitted from the input pinion assembly 36 to the differential assembly 14 to cause the differential case 50 to rotate. More specifically, the teeth of the input pinion 64 transmit rotary power to the ring gear 44, causing the ring gear 44 (and/or differential case) to rotate about axis 62. As the ring gear 44 rotates, a radially outward portion of it passes through the lubricant 40 in the lubricant reservoir/sump 28, permitting some of the liquid lubricant to cling to the differential assembly/ring gear 44 when the portion rotates out of the liquid lubricant 40 (see FIG. 3). The liquid lubricant 40 that clings to the differential assembly/ring gear 44 is then slung outwardly therefrom due to centrifugal force, thus, ideally lubricating portions of the assembly including differential bearings, pinion bearings, differential gears (e.g., pinion and side gears), etc. However, at least with conventional designs, an even distribution of lubrication throughout the assembly is not typically achieved.

Figure 4:
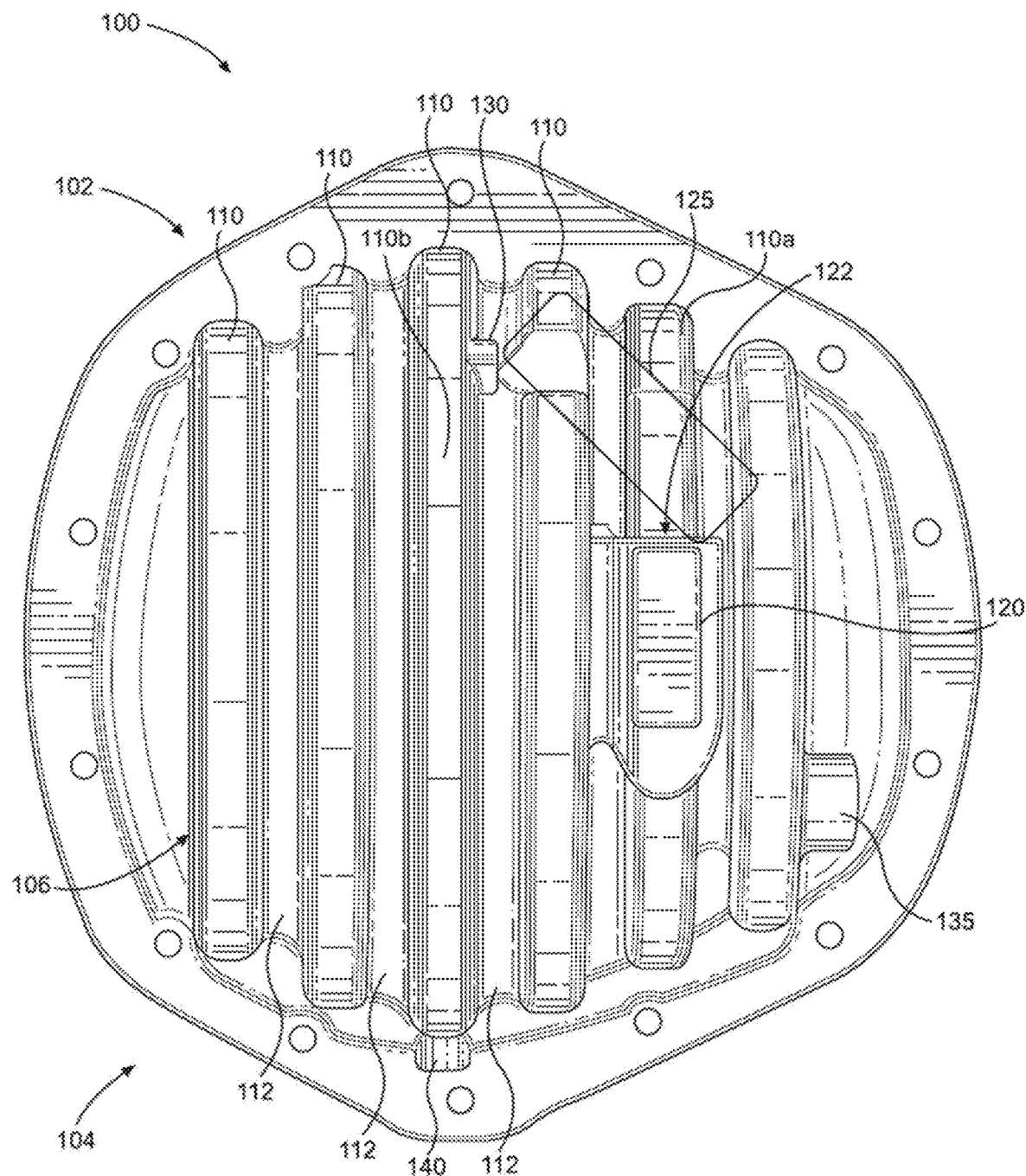
FIG. 4 shows a front view of a rear differential cover according to at least one embodiment of the present disclosure.
Figure 5:
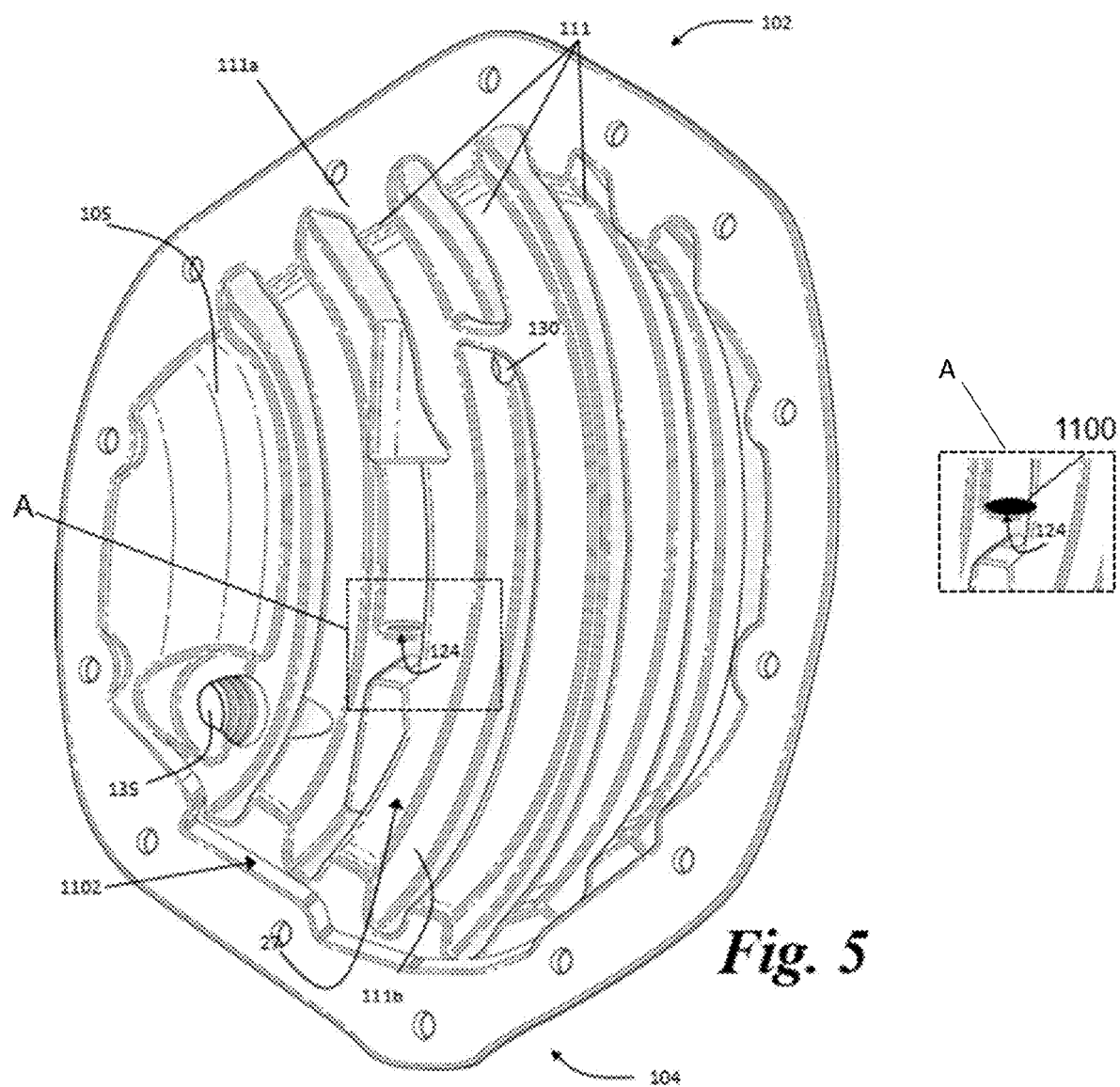
FIG. 5 shows a perspective view of the interior of the rear differential cover of FIG. 4, with window A showing an alternative embodiment having a deflector.
Figure 6:
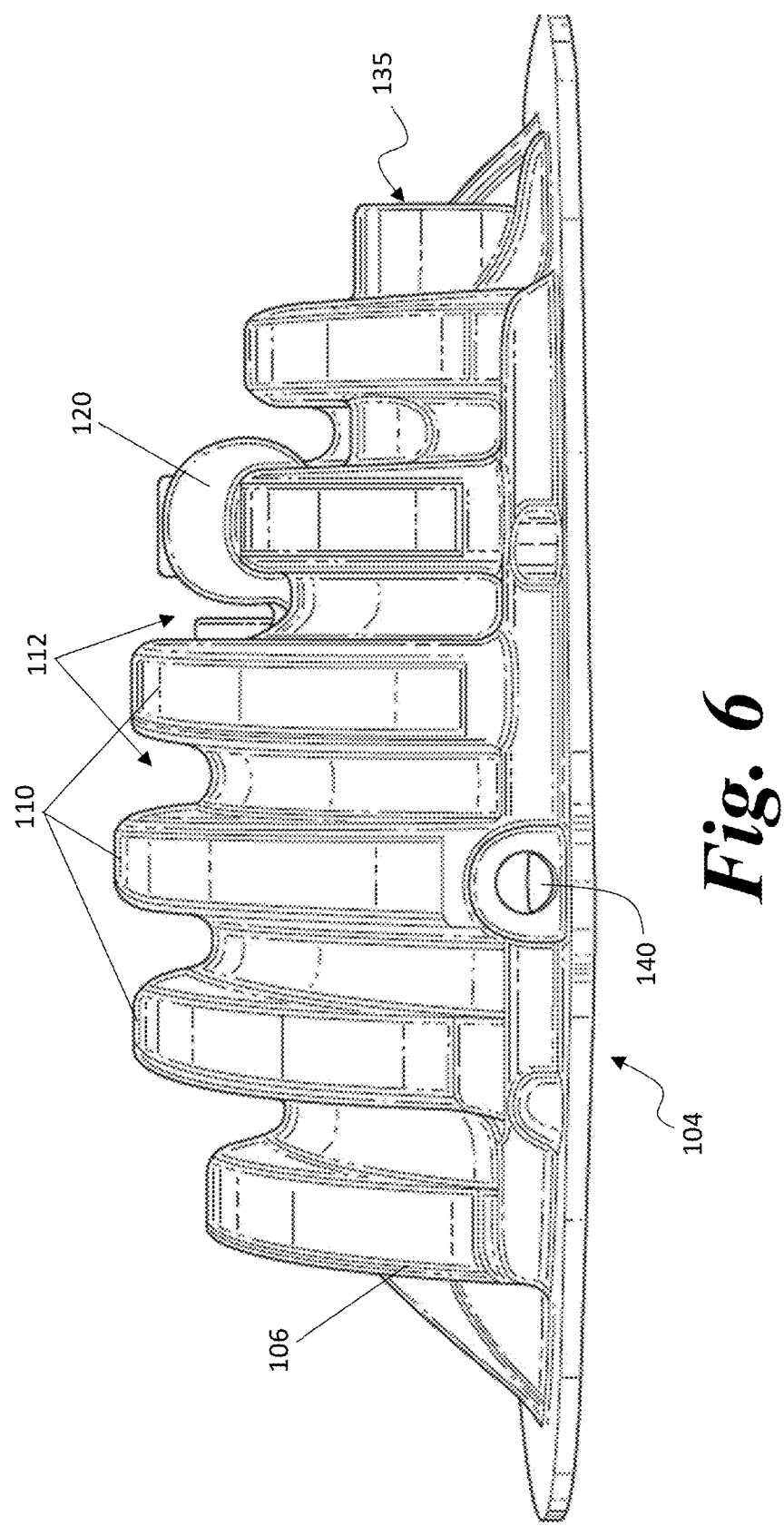
FIG. 6 shows a bottom view of the rear differential cover of FIG. 4 and provides a non-limiting example of an exterior profile thereof.

Now referring to FIGS. 4-6, at least one inventive rear differential cover 100 of the present disclosure is shown. The cover 100 may be made of aluminum, steel, plastic, or any other suitable material or combination of materials. In at least one embodiment, the material of the cover 100 is specifically for durability. Additionally or alternatively, at least one material of the cover 100 may be a thermally conductive material.

Cover 100 can be removably coupled to the housing 20 to close an open end of the differential cavity 36. The housing 20 and the cover 100 can cooperate to define the lubricant reservoir 28, and a suitable lubricant 40 (e.g., oil) can be contained therein. In at least one embodiment the cover 100 is molded and defines an interior cavity 27 that defines at least a portion of the reservoir 28 when the cover 100 is affixed to a housing 20. The differential cover 100 of the present disclosure provides various advantages over those of the prior art including that it can decrease the operating temperature of the lubricant 40 through convective heat transfer, is designed for ease of maintenance, provides beneficial fluid dynamics to provide effective lubrication within the differential assembly 14, and incorporates a pump-free lubricant filter to remove particulates from the circulating lubricant 40 and, thus, extend the life thereof.

In at least one embodiment, the cover 100 comprises a unitary, molded component having a top portion 102, a bottom portion 104, an interior surface 105, and an exterior surface 106. As shown in FIG. 5, a series of vertical channels 111 are formed within the interior surface 105 of the cover. Any number of vertical channels may be employed; however, the series of channels at least comprise a first channel 111*a* and a second channel 111*b*. The size, shape, and placement of each channel of the series of vertical channels 111 can be adjusted to achieve the desired lubrication distribution during operation of the differential assembly 14.

In at least one embodiment, each channel 111 comprises an elongated groove in the interior surface 105 that defines a depth, a width, and extends a length across the interior surface 105 of the cover 100. In the at least one embodiment shown in FIGS. 4 and 5, the length of each vertical channel 111 is sufficient such that each channel traverses the majority of the cover from at or near the top portion 102 to at or near the bottom portion 104 of the cover 100; however, each channel may comprise any depth, width and/or length as desired.

The channels of the series of vertical channels 111 may be configured to receive lubricant 40 slung therein and to redirect the force of the lubricant 40 flow along the length of such channel. In this manner, the series of vertical channels 111 can leverage the force of the lubricant 40 flow to provide more even distribution of the lubricant 40 throughout the interior of the differential cavity 36 (and the components therein).

Each of the vertical channels 100 may correspond to a ridge 110 formed on the exterior surface 106 of the cover 100. Indeed, as shown in FIG. 6, the exterior surface 106 may comprise a series of alternating ridges 110 and grooves 112 integrally formed therein as a consequence of the channel formation along the interior surface 105 of the cover 100. It will be appreciated that the inclusion of ridges 110 and grooves 112 creates a profile along the exterior surface 106 with a significantly increased surface area as compared a simple flat back or smooth profile. Accordingly, the series of alternating ridges 110 and grooves 112 creates a heat sink which allows more heat to dissipate into the air around the cover 100, thus reducing the oil temperature.

Figure 7:
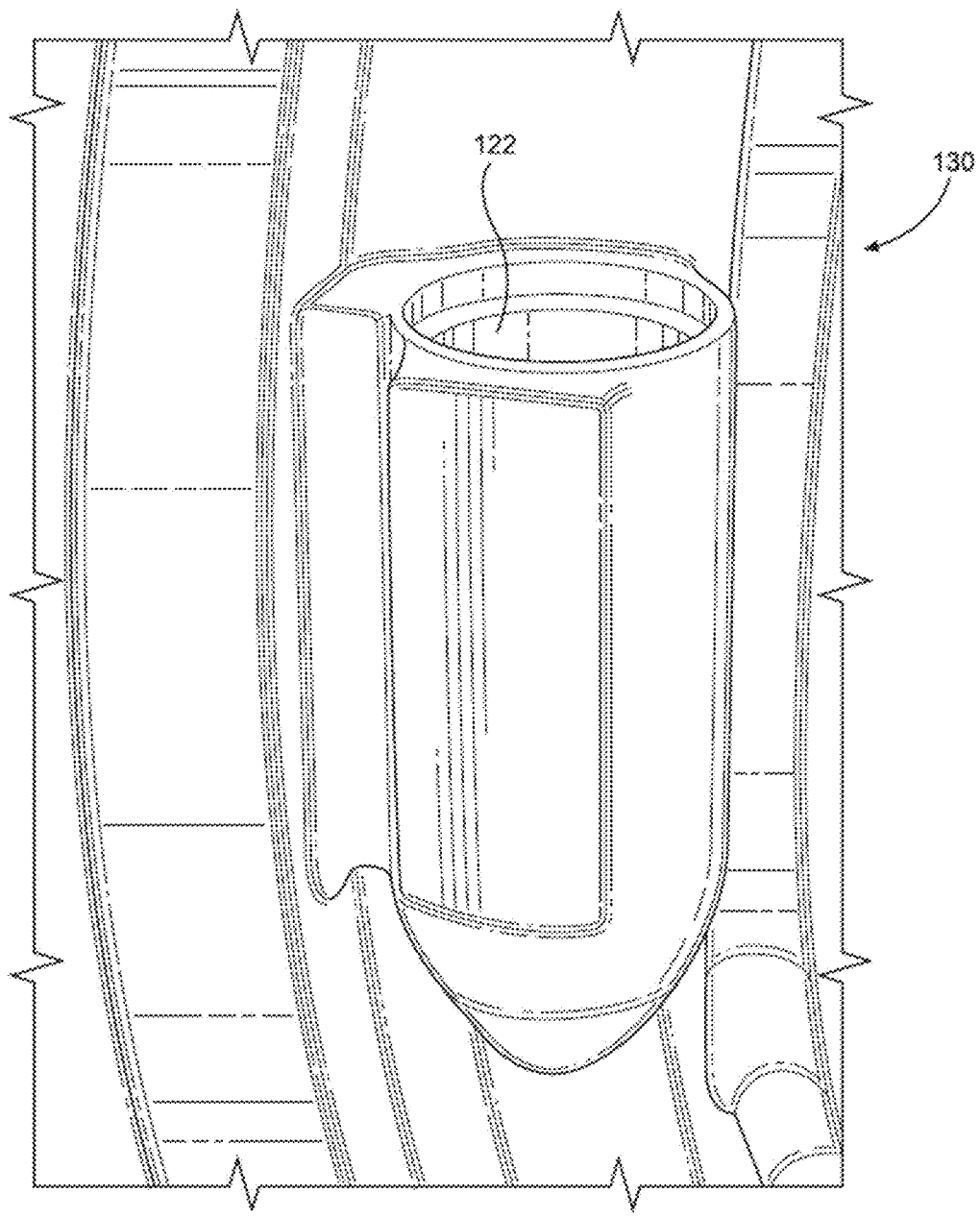
FIG. 7 shows a perspective view of a filter housing of a rear differential cover according to at least one embodiment of the present disclosure.
Figure 8:
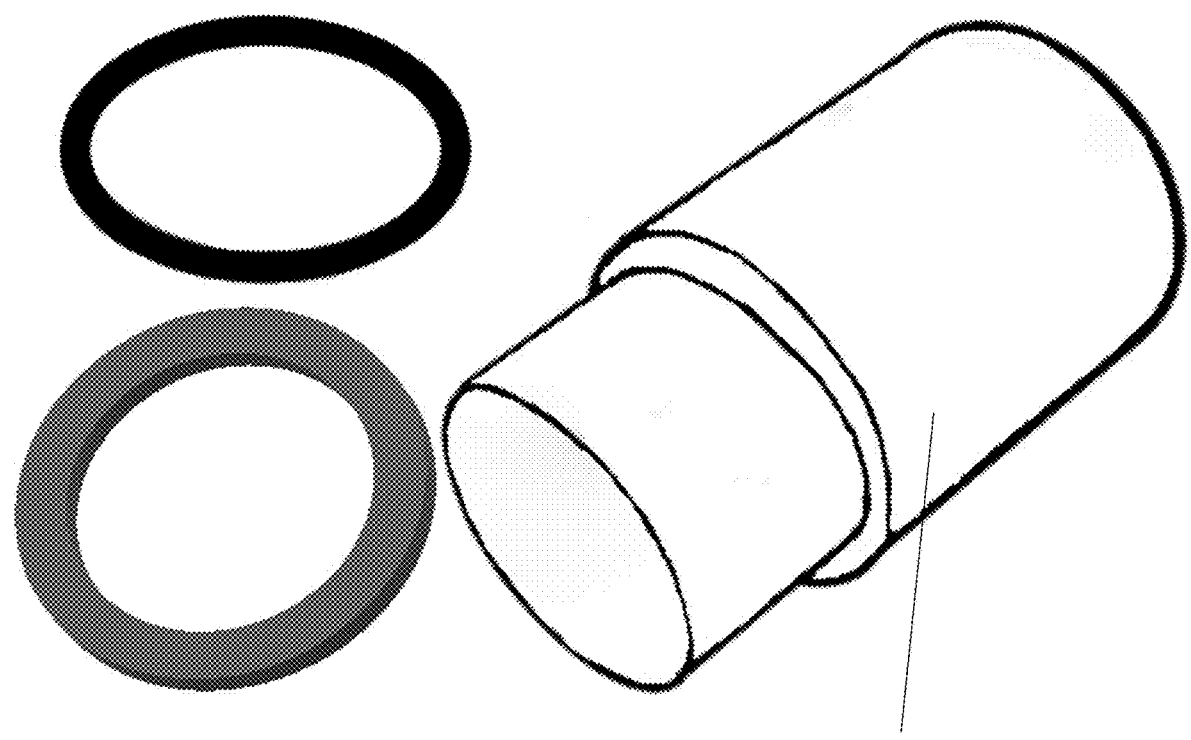
FIG. 8 shows a perspective view of a filter element configured for placement within the filter housing shown in FIG. 7.

The exterior surface 106 of the cover 100 further comprises a filter assembly 120. The filter assembly 120 may abut and/or be coupled with or fastened to the exterior surface 106 or integrally molded thereon and comprises a substantially hollow body extending between an inlet 122 and an outlet 124. As shown in FIG. 7, the inlet 122 of the filter assembly 120 comprises an opening configured to securely receive a hose, tube or other conduit (not shown). For example, the inlet 122 may comprise a lip, threading, or the like.

The second end of the filter assembly 120 is in fluid communication with an outlet 124. The outlet 124 forms an opening in the interior surface of the cover 100 such that fluid contained within the body can flow back into the reservoir 28. In at least one embodiment, the outlet 124 is formed with or adjacent to the first channel 111*a* such that lubricant 40 can flow through the inlet 122 of the filter assembly 120, through the filter element 126 (described below), and then back into the first channel 111*a* in the interior surface where the flow of the lubricant 40 is directed toward the bottom portion 104 of the cover 100 within the first channel 110*a*.

A deflector 1100 or other configuration may also be employed at or near the outlet 124 to prevent backflow of lubricant 40 back into the filter assembly 120.

The body of the filter assembly 120 is configured to receive a filter element 126. The filter element 126 may be an in-line drain filter element or any other filter element now known or hereinafter developed for filtering particulates from the lubricant 40. In at least one exemplary embodiment, the filter element 126 comprises a compact track loader, hydrostatic case drain oil filter cartridge such as, by way of non-limiting example, a Bobact® T190. Additionally or alternatively, the filter element 126 may have a micron rating at or between about 1270 microns and 5 microns. In at least one exemplary embodiment, the filter element 126 has a micron rating of about 40 microns. The filter element 126 may be seated within the body of the filter assembly 120 in conjunction with one or more gaskets, O-rings, and/or other fittings as appropriate to prevent lubricant leakage and facilitate flow through the filter element 126 as desired.

Referring back to the interior surface 105 of the cover 100, the second channel 110*b* is formed at a location thereon such that, when the cover 100 is affixed to a housing 20, the second channel 110*b* is circumferentially aligned with the ring gear 44 of the differential assembly 14 to receive lubricant 40 slung therefrom. Additionally, the second channel 110*b* is in fluid communication with at least one exit port 130. The exit port 130 is a hole passing through the cover 100 at or near the top portion 102 thereof and may comprise a lip or other component to facilitate secure connection with a tube, hose or conduit (not shown) on the side of the exterior surface 106 (see FIG. 4). While the at least one exit port 130 may be used as a fill port for accessing the reservoir 28 if needed, and capped with a plug or other removable barrier to seal the cavity 36, in at least one exemplary embodiment, the at least one exit port 130 is coupled with a tube, hose, or other conduit extending between the at least one exit port 130 and the inlet 122 of the filter assembly 120. Optionally, the exterior surface 106 of the cover 100 may further comprise a conduit path 125 formed therein to accommodate such tube, hose, or other conduit as it traverses between the at least one exit port 130 and the filter assembly 120.

In use, the ring gear 44 rotates at about several hundred revolutions per minute, which is similar to the speed of a conventional pump wheel. When a vehicle moves forward, the lubricant 40 in the reservoir 28 is picked up by the ring gear 44 and slung upward toward the interior surface of the cover 100. Due to the placement of the second channel 111*b*, the slung lubricant 40 is caught within the second channel 111*b* and directed upward towards and through the at least one exit port 130. The continuous sling of the lubricant 40 and its resulting velocity through the second channel 111b circulates lubricant 40 through the at least one exit port 130, through the filter assembly 120 (via the tube, hose, or conduit connecting the two), and returns to the reservoir 28 contained within the cover 100 via the outlet 124 of the filter assembly 120. Accordingly, in at least one embodiment of the present disclosure, cover 100 employs the ring gear 44 in lieu of a separate pump to circulate the lubricant 40 along the series of channels, through the filter assembly 120. Furthermore, as described above in connection with the heat sink design of the series of alternating ridges 110 and grooves 112 on the exterior surface 106, the forced flow of the lubricant 40 through the channels 110 also cools the lubricant 40 as the heat therein dissipates through the alternating ridges 110 and grooves 112.

The cover 100 may further comprise one or more additional holes or openings formed therein to assist in carrying out various functions. A second port 135 may be incorporated at or near the bottom portion 104 of the cover 100 as shown in FIG. 4. In at least one exemplary embodiment, the second port 135 is positioned above the lubricant fill line of the reservoir 28 such that, when opened, the differential cavity 36 and lubricant 40 level can be easily determined without dismantling the differential assembly 14 or risking lubricant 40 leaking from the reservoir 28. In such embodiments, a plug (not shown) may also be provided to seal the second port 135 during operation. A lubricant level marker or predetermined fill line (not shown) may be indicated adjacent to the third port 140 such that it is easily visualized therethrough.

A third port 140 may be located at or near the bottom portion 106 of the cover 100 to act as an easily accessible drain opening, and a drain plug (not shown) may be used to seal the third port 140 after the lubricant 40 has drained from the reservoir 36. A horizontal channel 1102 (see FIG. 5) may extend perpendicular to the series of vertical channels at or near the bottom portion 106 of the cover 100. In at least on exemplary embodiment, at least one of the horizontal channels 1102 is in fluid communication with the drain port (third port 140).

Figure 9:
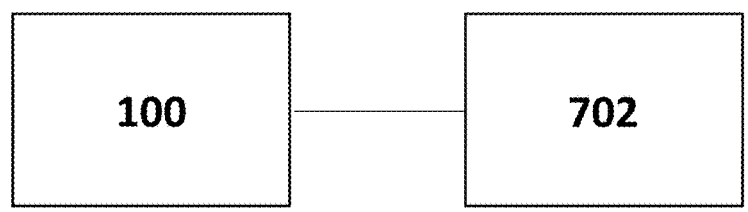
FIG. 9 shows a schematic diagram representative of a system for filtering and cooling a differential assembly according to at least one embodiment of the present disclosure.

Now referring to FIG. 9, a schematic diagram representative of a system 700 for heating and cooling a differential assembly is shown. System 700 comprises the cover 100 coupled with an auxiliary cooling system 702. The auxiliary cooling system 702 may comprise any auxiliary oil cooler now known or hereinafter developed in the relevant arts including, without limitation, an in-line oil cooler system or device or a deck mount oil cooler system or device, that circulates oil therethrough and reduces the temperature thereof.

In at least one embodiment, the auxiliary cooling system 702 comprises an inlet for receiving lubricant 40 from the cover 100 and/or filter assembly 120 and an outlet in fluid communication with the reservoir 28 via a hose or otherwise such that cooled lubricant can return to the differential assembly. For example, and without limitation, the second port 135 of the cover 100 may be in fluid communication with both the input of the auxiliary cooling system 702 and the outlet 124 of the filter assembly 120 via a hose or otherwise (not shown). In at least one embodiment, the second port 125 may be threaded or comprise a lip or other attachment means through which to securely receive a first end of a hose that is in fluid communication with the inlet of the auxiliary cooling system 702. In operation, lubricant 40 is circulated through the filter assembly 124 as described above, however, the filtered lubricant 40 flows into the auxiliary cooling system 702 via the outlet 124 of the filter assembly 120 and the second port 135, before the cooled lubricant 40 returns to the reservoir 28 contained within the cover 100. It will be appreciated that the driving force of the ring gear 44 continuously circulates the lubricant 40 through the auxiliary cooling system 702 and back into the reservoir 28 as described in the above embodiments.

While various embodiments of the devices, system and methods of using the same have been described in considerable detail herein, the embodiments are merely offered as non-limiting examples of the disclosure. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A cover for a vehicular differential assembly, the cover comprising:
   an exterior surface defining a series of alternating ridges and grooves;
   a series of vertical channels integrally formed on an interior surface of the cover, wherein each ridge of the exterior surface corresponds to a channel of the series of vertical channels of the interior surface;
   a filter assembly coupled with the exterior surface of the cover, the filter assembly comprising an inlet, an outlet integral with an opening to a first channel of the series of vertical channels of the interior surface of the cover, and a body extending between the inlet and outlet and configured to receive at least one filter cartridge therein;
   a first exit port in fluid communication with a second channel of the series of vertical channels of the interior surface, the second channel configured to direct a flow of lubricant slung therein toward and through the first exit port; and
   at least one hose coupled with the first exit port and the inlet of the filter assembly.

2. The cover of claim 1, further comprising the at least one filter cartridge positioned within the filter assembly.

3. The cover of claim 2, wherein the at least one filter cartridge is a 40 micron filter cartridge.

4. The cover of claim 1, wherein the outlet of the filter assembly is configured to direct lubricant flow into the first channel.

5. The cover of claim 4, wherein the outlet of the filter assembly further comprises a deflector to prevent backflow of lubricant into the body of the filter assembly.

6. The cover of claim 1, wherein each of the vertical channels extends between a top portion of the cover and a bottom portion of the cover.

7. The cover of claim 1, wherein the second channel is positioned on the interior surface of the cover such that, in use, when the cover is affixed to a differential assembly, the second channel is circumferentially aligned with a ring gear of the differential assembly so to receive lubricant slung therefrom.

8. The cover of claim 1, wherein the exterior surface comprises a thermally conductive material.

9. The cover of claim 1, further comprising a drain port positioned at or near a bottom portion of the cover and a horizontal channel extending perpendicular to the series of vertical channels, the horizontal channel at or near the bottom portion of the cover and in fluid communication with the drain port.

10. The cover of claim 1, further comprising a second exit port in fluid communication with the first channel of the series of channels.

11. The cover of claim 1, wherein the filter assembly is integrally formed with the exterior surface of the cover.

12. The cover of claim 1, wherein the cover is mountable on a differential housing of a rear differential assembly of a vehicle.

13. A system for filtering and cooling a differential assembly comprising:
a cover comprising:
an exterior surface defining a series of alternating ridges and grooves,
a series of vertical channels integrally formed on an interior surface of the cover, wherein each ridge of the exterior surface corresponds to a channel of the series of vertical channels of the interior surface,
a first exit port in fluid communication with a second channel of the series of channels, the second channel configured to direct a flow of lubricant slung therein toward and through the first exit port, and
a filter assembly coupled with the exterior surface of the cover, the filter assembly comprising an inlet in fluid communication with the first exit port, an outlet integral with an opening to a first channel of the series of vertical channels of the interior surface of the cover, and a body extending between the inlet and outlet, the body configured to receive at least one filter cartridge therein, and
at least one hose coupled with the first exit port and the inlet of the filter assembly; and
an auxiliary cooling system in fluid communication with a second exit port via a conduit.

14. The system of claim 13, further comprising a differential assembly comprising:
a housing defining a second cavity and having at least one open side;
a ring gear positioned within the second cavity of the housing;
a pinion received in the second cavity, the pinion having a plurality of teeth that are meshingly engaged with the ring gear; and
a lubricant received within the second cavity;
wherein the cover is affixed to the at least one open side of the housing of the differential assembly such that a first interior cavity of the cover and the second cavity of the housing communicate and the second channel of the cover is circumferentially aligned with the ring gear of the differential assembly so to receive lubricant slung therefrom.

15. The system of claim 14, further comprising a gasket positioned between the housing and the cover.

16. A method for filtering and cooling a differential assembly without a pump, the method comprising:
providing a cover comprising:
an exterior surface defining a series of alternating ridges and grooves,
a series of vertical channels integrally formed in an interior surface of the cover, wherein each ridge of the exterior surface corresponds to a channel of the series of vertical channels of the interior surface,
a filter assembly on the exterior surface of the cover, the filter assembly comprising an inlet, an outlet integral with an opening to a first channel of the series of vertical channels of the interior surface of the cover, and a body extending between the inlet and outlet and configured to receive at least one filter cartridge therein,
a first exit port in fluid communication with a second channel of the series of vertical channels of the interior surface, the second channel configured to direct a flow of lubricant slung therein toward and through the first exit port, and
at least one hose coupled with the first exit port and the inlet of the filter assembly,
wherein the cover is affixed to a vehicular rear differential housing and defines a reservoir therewith;
rotating a ring gear positioned within an interior of the vehicular rear differential housing to sling lubricant within the reservoir into the second channel of the cover; and
directing the flow of the slung lubricant using the second channel of the cover through the first exit port and into the filter assembly;
wherein rotation of the ring gear drives the slung lubricant through the second channel, through the filter assembly via the first exit port, and back into the interior of the vehicular rear differential housing via the outlet of the filter assembly.

17. The method of claim 16, wherein the exterior surface of the cover comprises the series of alternating ridges and grooves, each ridge corresponding to a channel of the series of vertical channels integrally formed in the interior surface of the cover and comprising a thermally conductive material, and further comprising the step of:
directing the slung lubricant through the series of vertical channels to cool the lubricant through convective heat transfer via the series of ridges and grooves.

18. The method of claim 16, further comprising:
providing an auxiliary cooling system in fluid communication with a second exit port via a hose; and
directing the slung lubricant through the second exit port and through the auxiliary cooling system.

19. The method of claim 18, further comprising:
returning lubricant cooled by the auxiliary cooling system to the reservoir of the vehicular rear differential housing.

* * * * *